United States Patent [19]

Parks

[11] Patent Number: 5,163,145

[45] Date of Patent: Nov. 10, 1992

[54] CIRCUIT FOR DETERMINING BETWEEN A FIRST OR SECOND TYPE CPU AT RESET BY EXAMINING UPPER M BITS OF INITIAL MEMORY REFERENCE

[75] Inventor: Terry J. Parks, Round Rock, Tex.

[73] Assignee: Dell USA L.P., Austin, Tex.

[21] Appl. No.: 343,102

[22] Filed: Apr. 25, 1989

[51] Int. Cl.⁵ .............................................. G06F 1/24
[52] U.S. Cl. ................................... 395/500; 395/800;
364/DIG. 2; 364/949.4; 364/933.2; 364/929.5
[58] Field of Search ..................... 365/189.11, 230.08;
307/475, 465; 364/130–134, 900 MS File, 200
MS File; 377/2.2, 21.4, 40.1; 395/800, 500

[56] References Cited

U.S. PATENT DOCUMENTS

| | | | |
|---|---|---|---|
| 4,070,704 | 1/1978 | Calle et al. | 364/200 |
| 4,315,308 | 12/1978 | Jackson | 364/200 |
| 4,167,781 | 9/1979 | Beccia | 364/200 |
| 4,432,067 | 2/1984 | Nielsen | 364/900 |
| 4,592,011 | 5/1986 | Mantellina | 364/900 |
| 4,641,261 | 5/1984 | Dwyer et al. | 364/900 |
| 4,654,789 | 3/1987 | Nusinov et al. | 364/200 |
| 4,667,305 | 5/1987 | Dill et al. | 364/900 |
| 4,677,548 | 6/1987 | Bradley | 364/200 |
| 4,727,477 | 2/1988 | Gavril | 364/200 |
| 4,766,538 | 8/1988 | Miyoshi | 364/200 |
| 4,866,664 | 9/1989 | Burkhardt et al. | 364/900 |
| 4,885,482 | 12/1989 | Sharp et al. | 307/465 |
| 4,967,346 | 10/1990 | Freidin | 364/200 |
| 4,987,529 | 1/1991 | Craft et al. | 364/200 |
| 4,991,085 | 2/1991 | Pleva et al. | 364/200 |

OTHER PUBLICATIONS

MC68881/MC68882 Floating-Point Coprocessor User's Manual, Motorola Inc., Prentice Hall, section 10-1.

Primary Examiner—Thomas C. Lee
Assistant Examiner—L. Donaghue
Attorney, Agent, or Firm—James W. Huffman

[57] ABSTRACT

A computer system provides a RESET-signal for resetting registers upon start-up of the system, and includes a central processor unit (CPU) of an optional type and a detect circuit for determining which optional type. On start-up, the CPU sends out an initial memory reference at the highest possible address. The first type of CPU has a memory address register of N bits. The memory address register of the second type of CPU has a memory address register of N+M bits. The upper M bits input to the memory address register of the first type of CPU are grounded. A detect circuit is activated by the CPU addressing memory and receives at least one of the M upper bits. If that bit is not grounded, then the CPU is of the second type and, if grounded, it is of the first type. The RESET-signal upon start-up assures that the detect circuit will be activated on start-up.

5 Claims, 3 Drawing Sheets

CIRCUIT FOR DETERMINING BETWEEN A FIRST OR SECOND TYPE CPU AT RESET BY EXAMINING UPPER M BITS OF INITIAL MEMORY REFERENCE

BACKGROUND OF THE INVENTION

1. Field of the Invention

This invention relates to computer systems that can use one of two optional CPUs. More particularly, it relates to computer systems that have optional CPUs and an automatic detection circuit for detecting which type of optional CPU is employed.

2. Description of the Prior Art

A typical prior art solution was to add a pin to the chip implementing the CPU to indicate the type of CPU.

A more advanced prior art technique is that used when the CPU and a co-processor, for example, which are normally bilaterally connected, have the pin(s) ordinarily used for such communication to indicate the presence or absence of the co-processor at start-up.

BRIEF SUMMARY OF THE INVENTION

A digital computer system may employ one of two optional types of CPUs. The first type has a memory address register that is N bits long. The CPU of the second type has a memory address register that is N+M bits long. When the first type of CPU is used, the upper M bits are grounded.

The computer system provides a RESET-signal that, upon start-up of the system, sends out the signal for resetting various registers throughout the system. Also, upon start-up, the CPU sends out a memory reference that begins fetching from the highest possible address. With the upper M bits grounded in the first type of CPU, the detect circuit can differentiate between the two types. The detect circuit is activated by RESET, MEMORY-READ signal, and a signal from at least one of the M bits. If the M bit is grounded, then the CPU is of the first type. If the M bit is not grounded, then the CPU is of the second type. The RESET signal is a necessary input for this information and the circuit is activated only upon start-up of the computer system.

It is vital that the system know which of the two processors is present because they have different sized data buses, different sized address buses, and different numbers of byte selects. The memory controller must be adjusted for such variables. The memory controller must be set to move the upper 16 bits of each 32-bit word to the lower 16 bits when the memory is accessed in the first type of CPU.

The principle object of this invention is to detect, within a digital computer system, which of two optional CPUs is being used in the system.

This and other objects will be made evident in the detailed description that follows.

DETAILED DESCRIPTION OF THE INVENTION

Figure 1:
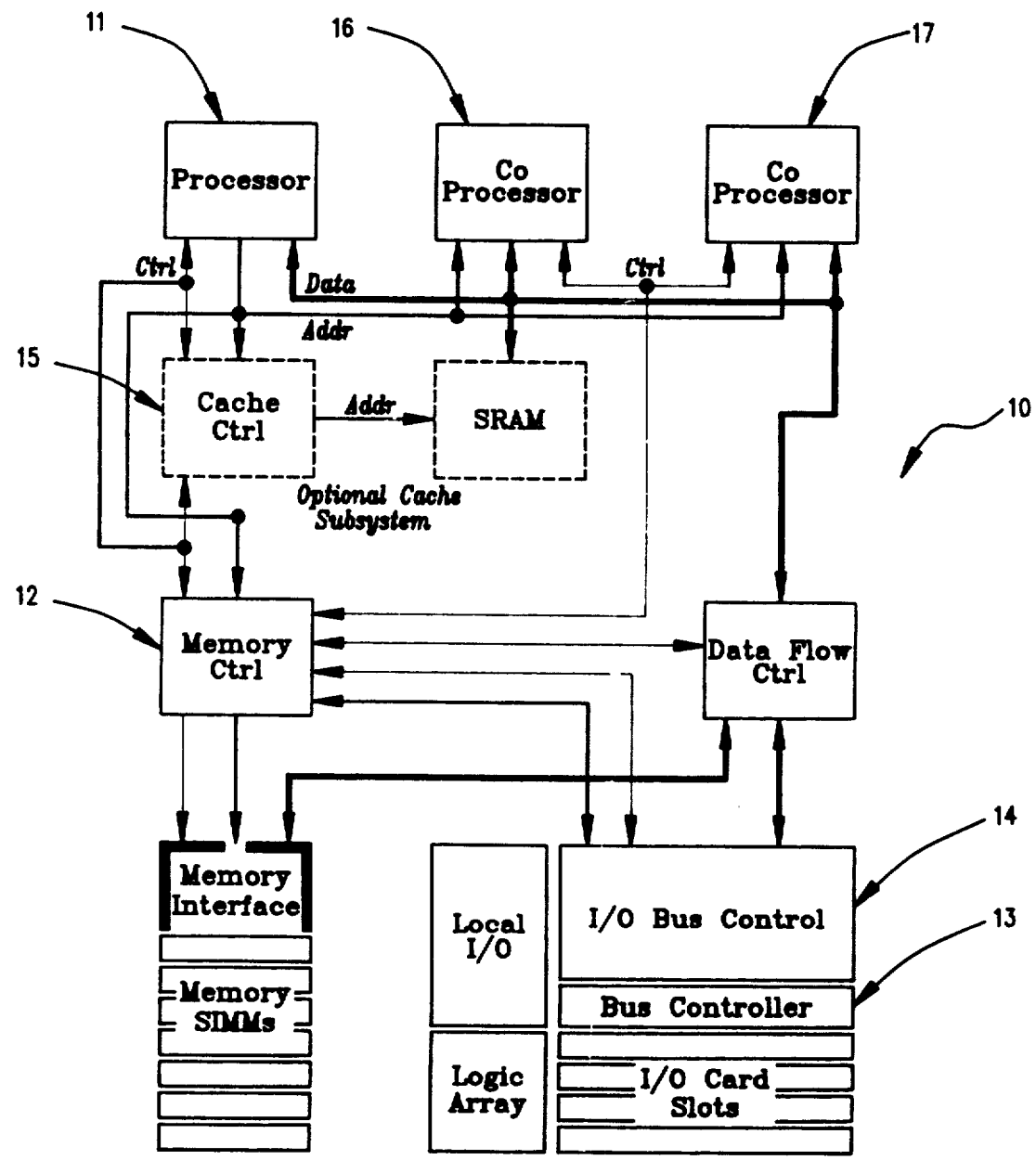
FIG. 1 is a block diagram of the computer system of this invention.

FIG. 1 illustrates computer system 10 having processor 11, with optional co-processors 16 and 17. In this preferred embodiment, processor 11 is an Intel Corporation 80386SX or an Intel Corporation 80386. Memory controller 12 and bus controllers 13 and 14 must "know" which type of processor is employed because in the 80386SX based system, the upper 16 bits of each 32-bit word must be transferred to the lower 16 bits position when the memory is accessed. Furthermore, the two processors have different size address buses and different numbers of byte selects. The remaining components shown in computer system 10 are not pertinent to this invention and will not be discussed herein.

Figure 2:
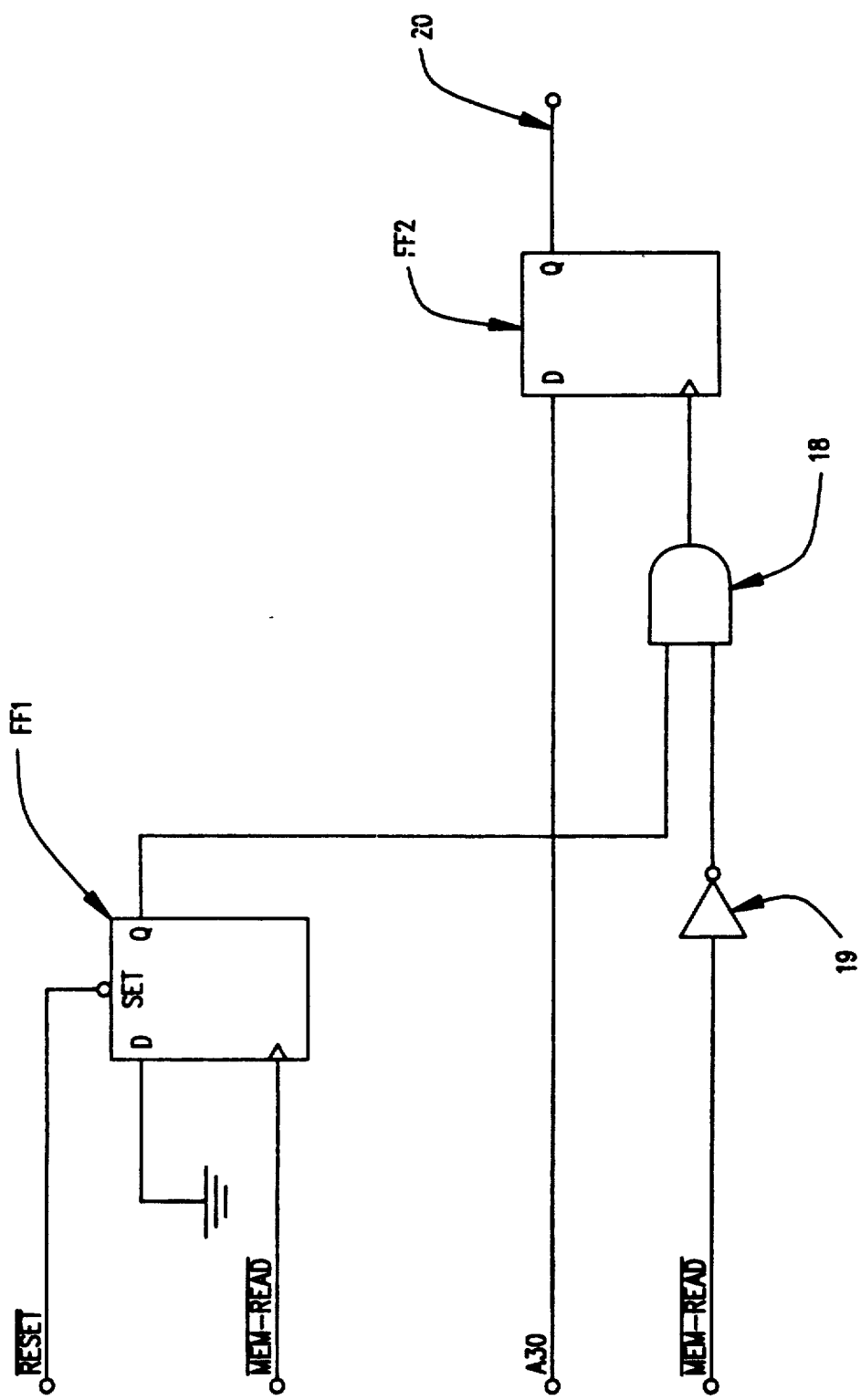
FIG. 2 is a schematic diagram of the detect circuit of this invention.

FIG. 2 illustrates flip-flop FF1 having RESET-signal applied to its SET-input. The D input of flip-flop FF1 is grounded and flip-flop FF1 is clocked by signal MEM-READ-.

The Q output from flip-flop FF1 provides one input to AND gate 18 whose other input is provided by signal MEM-READ-, inverted through inverter 19. Output from AND gate 18 clocks flip-flop FF2 whose D input is supplied by address register bit A30. The Q output from flip-flop FF2 provides identification (on line 20) of processor 11.

Figure 3:
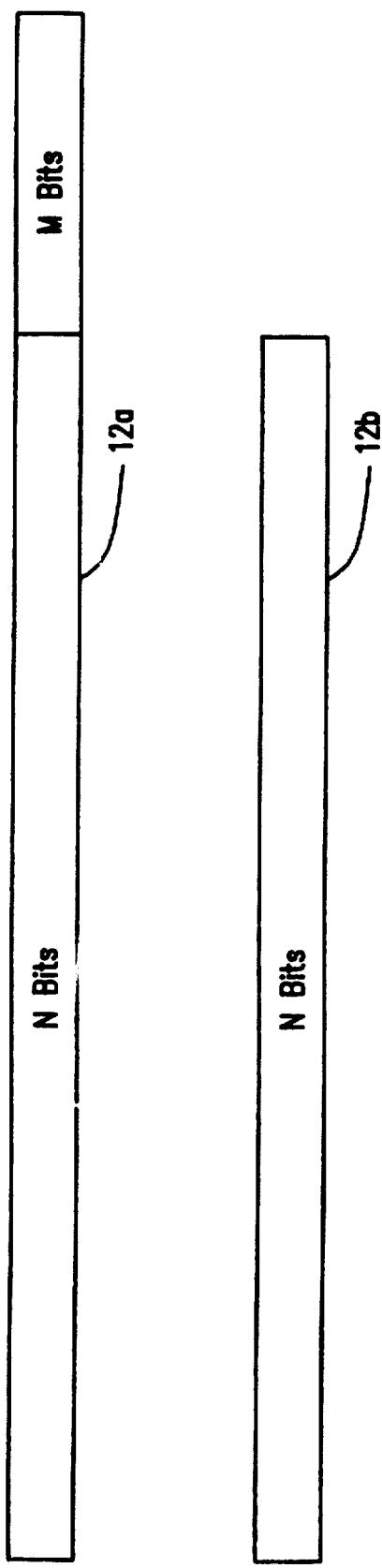
FIG. 3 illustrates the memory address registers of this invention.

FIG. 3 illustrates memory address register 12a having a total of 32 bits, in this preferred embodiment, broken down into 24N bits and 8M bits for use in the 80386 type of CPU. Memory address register 12b, 24 bits long in this preferred embodiment, is used in the 80386SX type of CPU.

MODE OF OPERATION OF THE INVENTION

When the first type of CPU (80386SX) is employed, the upper M bits input to the address register are grounded. When the second type of CPU (80386) is used, the upper M bits are used for addressing. In this preferred embodiment, the 80386SX type of CPU employs 24 address bits and the 80386 type of CPU employs 32 address bits.

Upon start-up, RESET-signal is applied to the SET-input of flip-flop FF1 setting flip-flop FF1 to a high voltage level because the D input is applied to a low voltage level (ground). The high voltage level on the Q output of flip-flop FF1 is applied to AND gate 18 as is signal MEM-READ- (inverted). This enables the setting of flip-flop FF2 with the value applied on its D input from address register bit A30. When A30 comes from a system employing the 80386SX type of CPU, it will be at a low voltage (grounded) applied to flip-flop FF2 by the output of AND gate 18 providing a low voltage output on line 20 which indicates that the 80386SX type of CPU is employed.

If a 80386 type of CPU is used, then address bit A30 will be at the high voltage level and flip-flop FF2 will be set to that high voltage level, indicating (on line 20) that the 80386 CPU is being used in the system.

It should be noted that the purpose of flip-flop FF1 and associated circuitry is to permit setting of flip-flop FF2 only upon start-up of the system.

Those skilled in the art may employ reverse logic circuitry, change the components and the general logic, all without departing from the scope and spirit of this invention which is limited only by the appended claims.

The invention claimed is:

1. A computer system providing a RESET-signal for resetting registers upon startup of the computer system, and including a central processor unit (CPU) of a first or a second type and a detect circuit for determining the identification of the CPU of the first type or the CPU of the second type, wherein upon startup of the computer system the CPU of the first or second type sends out an initial memory reference at the highest possible address, comprising:

(a) a memory responsive to addressing of N-M bits, wherein M and N are positive integer values;

(b) a memory address register of N bits in the CPU of the first type for addressing the memory or a memory register of N+M bits in the CPU of the second type wherein M is the upper M bits of said N-M bit memory address register, for addressing the memory, wherein the upper M bits input to the CPU of the first type are connected to a first voltage level; and (c) a detect circuit for receiving the RESET-signal at the first voltage level upon startup of the computer system to activate the detect circuit to detect at least one of the upper M bits when the CPU of the first or second type sends out the initial memory reference at the highest address, the one bit being of the first voltage level from the CPU of the first type, and of a second voltage level from the CPU of the second type.

2. The computer system of claim 1 wherein the detect circuit comprises a gating circuit, operable only upon startup of the computer system initial address, to identify the CPU of the first type or the CPU of the second type.

3. The computer system of claim 2 wherein the gating circuit comprises a first flip-flop receiving the RESET-signal at its SET-terminal clocked by a memory read signal (MEM-READ-) from the CPU of the first or second type to provide an output signal at the second voltage level, and having an input with a signal at the first voltage level to provide an output at the first voltage level when the RESET-signal goes to the second voltage level.

4. The computer system of claim 3 wherein the detect circuit further comprises a second flip-flop, clocked by a MEM-READ- signal from the CPU of the first or second type and the output from the first flip-flop, with the one bit connected to the input of the second flip-flop to set the second flip-flop to the one voltage level when the CPU of the first type is present and to the second voltage level when the CPU of the second type is present.

5. The computer system of claim 4 wherein the first voltage is of a lower magnitude and the second voltage is of a higher magnitude with respect to each other.

* * * * *